Dec. 2, 1969  W. A. AYRES  3,481,725
MARKING OF CLINICAL THERMOMETERS
Filed Aug. 17, 1967
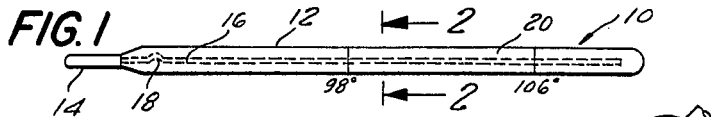
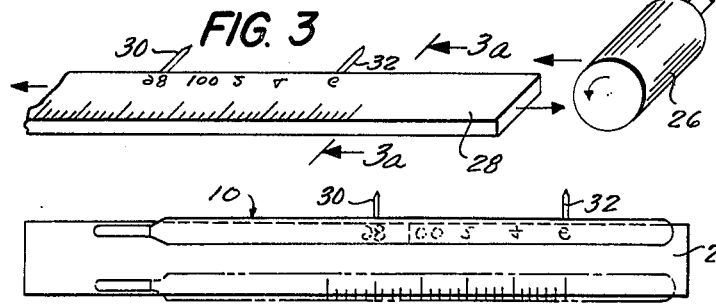
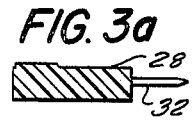
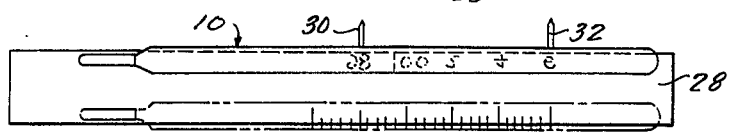
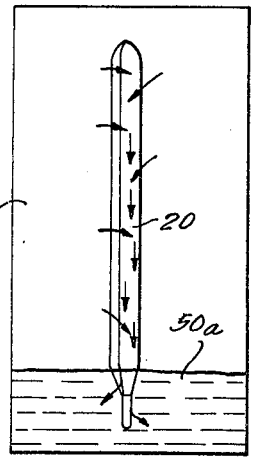
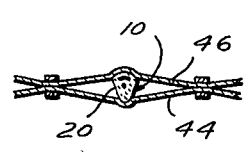
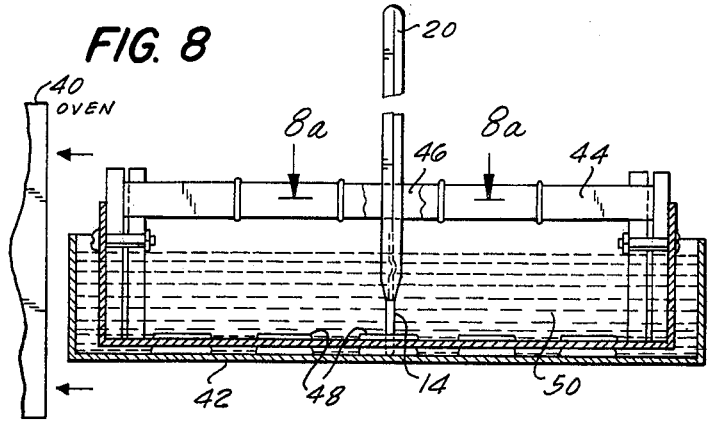
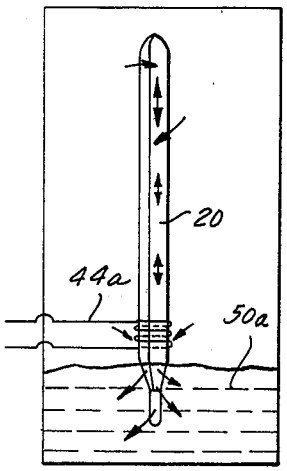
INVENTOR
WALDEMAR A. AYRES
BY
Kane, Dalsimer, Kane, Sullivan & Smith
ATTORNEYS United States Patent Office 3,481,725
Patented Dec. 2, 1969

3,481,725
MARKING OF CLINICAL THERMOMETERS
Waldemar A. Ayres, Rutherford, N.J., assignor to Dickinson Becton and Company, East Rutherford, N.J., a corporation of New Jersey
Continuation-in-part of application Ser. No. 415,712, Dec. 3, 1964. This application Aug. 17, 1967, Ser. No. 661,269
Int. Cl. C03c 17/00
U.S. Cl. 65—30
5 Claims

ABSTRACT OF THE DISCLOSURE

A method of placing calibration marks and numbers on glass clinical thermometers. An elastic printing plate is used to transfer a sticky viscous substance to the thermometer blank thereby also transferring representations of the markings thereon. A stain is dusted on the blank so that it adheres to the sticky substance. The mercury is maintained in the bulb portion which is cooled. The remainder of the thermometer is heated to develope the stain to form permanent markings. Supplemental heat is applied above the bulb and below the mark portion to maintain the entire stem at the same temperature.

CORSS REFERENCES TO RELATED APPLICATIONS

This application is a continuation in part of my application Ser. No. 415,712, filed Dec. 3, 1964 and now abandoned.

BACKGROUND OF THE INVENTION

This invention relates to an improved method of placing calibration marks and numbers on glass clinical thermometers.

There have generally been two approaches to the marking of clinical thermometers, one of which resulted in the frit marked thermometer and the other in the etched and filled pigment marked thermometer. With respect to the frit marked thermometer, a ceramic compound was applied in the form of marks and fused to the surface of the thermometer stem. In the etched and filled pigment marked thermometer, a thermometer stem was etched with hydrofluoric acid according to the outline of the scale and other marking desired, and the ensuing pits were filled with pigment. The difficulty with the frit marked thermometer was that the frit tended to chip off and leach out with frequent handling and sterilization. Similarly, the etched and filled marked thermometers under constant sterilization and handling lost their marking as a result of the falling out of the pigment filling.

In the recent past, a stain marked thermometer has been introduced. In this connection, a composition containing a heat decomposable metallic compound is arranged on the thermometer stem in the pattern of the desired marking. The thermometer is then heated in an oven to a certain degree upon which the metallic constituent of the compound migrates into the surface of the glass and stains the same in the outline of the marking. It is with respect to the stain marked thermometer that the present invention is particularly directed.

In manufacturing thermometers by this process a prohibitive difficulty is often encountered in developing the scales, numbers and other indicia on the glass. Numerous thermometers have been made which are perfect in all other respects, but the scales were developed to full color, blackness, only in the top and central portion, with lower characters being progressively a brown, a light brown, tan, and often the lowest characters are only faintly visible. Such products, of course, are rejects and are totally unfit for sale.

Various procedures were attempted for alleviating this problem such as placing fans within the ovens to ensure that the hot air was vigorously circulated and not cooled off at the surface of the water. This method was unsuccessful in solving the problem and any attempt to increase the temperature of the oven air was unsuccessful because this temperature has an important upper limit beyond which the glass thermometers would warp causing "bananas." The term "bananas" is descriptive of the shape of the warped thermometers which are, of course, also rejects.

Extensive tests were carried out to determine the cause of this heat loss at the lower end of the stem of the thermometer blank and the result was the discovery that the thermometer was losing heat down through its own cross section and into the cooling water faster than the thermometer was absorbing heat from the turbulent furnace air. A new device and a process which would alleviate this heat loss would provide a considerable improvement in the known art of staining thermometers.

SUMMARY OF THE INVENTION

It is therefore, a primary object of this invention to stain mark clinical thermometers whereby during the development of the stain within an oven or other heating means, an auxiliary heater would be provided just above the cooling water and well below the lowest number on the thermometer scale so that the stain may be evenly developed along the length of the thermometer stem.

In accordance with the present invention, thermometer blanks are provided with the 98° and 106° F. point marks thereon. These are applied in accordance with the usual and well known manufacturing procedures. An elastic printing plate is stretched or elongated so that the corresponding scale markings and numbers thereon match or coincide with the distance between the point marks on the thermometer blank. The characters and lines of the printing plate are then coated with a relatively viscous and sticky vehicle. The thermometer blank and the printing element are then pressed or otherwise shifted into engagement with one another for purposes of printing the vehicle on the thermometer blank to form a graduated scale having corresponding numerals and desired indicia. A powdered permanent mark producing substance is then dusted on the printed scale and markings. This substance is preferably of the type adapted to liberate metal ions which then migrate into the surface of the glass of the stem; and the substance may be selected from any one of a number of suitable silver compounds, preferably silver sulphate. The thermometer is then adequately cooled and then centrifuged to locate all of the mercury in the bulb and constriction whereby no mercury is present in the column above. The printed portions of the thermometer are then subjected to heat to develop the stain. Simultaneously therewith, the bulb and constriction are cooled to prevent the mercury rising in the column and bursting the thermometer. An auxiliary heater is positioned just above the cooling water and well below the lowest number on the thermometer scale in contact with the thermometer. This auxiliary heater is adjusted so that it transfers to the thermometer just the amount of heat that the cooling water lower down extracts from the thermometer during the development of the stain. In this way, the temperature of the thermometer glass at the auxiliary heater is maintained at the same temperature as the thermometer glass above the auxiliary heater. Consequently, no heat flows from the upper part of the thermometer downwardly so that all of the thermometer blank above the auxiliary heater is maintained at full baking temperature thereby fully developing the stain along the entire length of the thermometer stem.

Other objects and advantages will become apparent from the following detailed description which is to be taken in conjunction with the accompanying drawing illustrating a manner of practicing the instant invention.

BRIEF DESCRIPTION OF THE DRAWING

Reference is made to the accompanying drawing, in which:

FIG. 1 is a side elevational view of a thermometer blank the stem of which bears point marks previously calibrated on the blank for exemplary temperatures of 98° and 106° F.;

FIG. 2 is a cross sectional view taken along the plane of line 2—2 of FIG. 1;

FIG. 3 is a perspective view of a stretchable printing plate for applying the desired marking and indicia to the stem of the thermometer blank, with a roll applicator being schematically shown for purposes of applying the selected vehicle employed for associating the staining pigment with the glass of the blank;

FIG. 3a is a cross sectional view taken along the lines 3a—3a of FIG. 3;

FIG. 4 is a top plan view showing the blank being pressed against the printing plate for purposes of causing the transfer of vehicle onto the blank stem, the phantom line representation being of the association of another face of the blank stem with other parts of the printing plate in completing the vehicle transfer operation;

FIG. 5 is a perspective view of the thermometer blank having the vehicle transferred to areas comprising a scale and the corresponding numerals therefor at the staining pigment applying station at which the selected staining pigment is brushed onto the blank in such a manner that the pigment adheres only to that portion of the blank having the vehicle adhered thereto;

FIG. 6 is a perspective view of a thermometer blank within an oven during development of the stain with the bulb portion of the thermometer placed within a cooling bath and arrows showing the direction of heat transfer loss along the thermometer stem when no auxiliary heating means is employed;

FIG. 7 is a perspective view of a thermometer blank placed within an oven during development of the stain with the thermometer bulb being placed within a cooling bath and arrows showing that there is no heat transfer loss along the length of the thermometer stem when an auxiliary heater is properly positioned just above the portion of the thermometer blank, within the cooling bath and is transferring the predetermining amount of heat to the thermometer stem.

FIG. 8 is illustrative of the heating station at which the thermometer blanks having the vehicle adhered pigment applied is exposed to elevated temperatures while the bulb and constriction thereof is kept cool in order to cause the desired migration of the metallic ions into the glass to cause the permanent stain of the scale and numerals as well as other indicia thereon;

FIG. 8a is a fragmentary sectional view taken along the line 8a—8a of FIG. 8; and FIG. 9 is a perspective view of a thermometer that is provided with the permanent marking according to this invention.

DESCRIPTION OF THE PREFERRED EMBODIMENTS

Referring primarily to FIGS. 1 and 2, the reference numeral 10 indicates a blank of a thermometer of the clinical type which is essentially triangular in cross section. Blank 10 includes a stem 12 and a bulb 14 at one of its ends which communicates with a bore 16. This bore 16 is formed with a constriction 18 at a location adjacent bulb 14 whereby mercury in stem bore 16 will retain the maximum temperature reading of the patient, until the thermometer is "shaken" or centrifuged down again.

Thermometer blank 10 is provided with initial calibrations that are suitably marked with ink, for example, with point marks on the stem lens face 20 at 98° and 106° F. This is accomplished in accordance with conventional techniques; and as will be evident from the drawings, the top chamber employed during these initial steps was previously removed and the top of stem 12 is closed off and sealed.

Thus, the thermometer blank shown in FIGS. 1 and 2 has been completed to the point where graduations are to be applied so that the height of the heat responsive fluid within bore 16 may be accurately determined. In accordance with the present invention, these graduations will eventually appear upon face 20 while face 22 will include the corresponding numerals and other incidental indicia may appear upon stem face 24.

Pursuant to this invention, the scale graduations, numerals, indicia and other markings are placed on the glass stem through the employment of a composition arranged in the selected pattern. This composition contains a heat decomposable metallic compound whose metallic constituent migrates into the surface of the glass and causes a staining at such locations. It is thought that, in the case of borosilicate glass commonly employed in the manufacture of thermometer glass, the metallic ions replace the sodium of the glass to thereby become a permanent and integral part of the glass structure. In accordance with a preferred application of this invention, silver sulphate is employed as the staining pigment.

A preferred application of the staining pigment assures that an optimal amount of this substance is present during heating or baking whereby the desired migration of the silver ions takes place. To this end a vehicle is initially applied to the surface of the glass in accordance with the prescribed marking following which the staining pigment is deposited over or otherwise applied to those areas of the vehicle on the glass stem surfaces.

As previously explained, the locations of the point marks are virtually never the same for various different thermometer blanks nor is the distance therebetween a constant. Therefore, the vehicle is applied in accordance with a preferred technique by means of an elastic printing plate adapted to stretch or otherwise elongate so that the corresponding scale markings and numbers thereon match the distance between the point marks on the thermometer blank 10. The printing plate will include a coating of the vehicle over the raised elements such that contact of these raised elements with the surface of the glass will cause a transfer of the vehicle in the indicia area. The vehicle preferably has relatively high viscosity and pronounced adhesive or tack qualtites while not being an inhibitor to later development of the staining material. Various common types of spar or other types of varnishes have been found to work successfully.

Thus, a vehicle applicator roll 26, when operated, is adapted to apply a relative thin layer of the selected vehicle on the raised characters and indicia appearing on the strechable printing plate 28. This printing plate 28 is provided with pointed needles 30 and 32 projecting outwardly and these are located at the 98° and 106° graduations on the plate. Naturally, other indexing means or marks may be employed such as index marks provided directly on the plate or rubber molded simulated needles or the like. It should also be understood that this invention also contemplates the employment of optical systems for obtaining alignment of the indexing means provided on the strip 28 with the point marks appearing on the thermometer stem.

Printing plate 28 may be formed of a stretchable rubber or other elastomeric material which may now be suitably stretched the desired extent through the operation of a suitable jig (not shown) designed for such purpose. Another jig may also be adapted to hold the thermometer blank 10 in a substantially fixed longitudinal position while permitting its turning to expose the different faces 20, 22, and 24 to the desired raised characters.

The stretched rubber or printing plate 28 and thermometer blank 10 are pressed together along the flattened face 20 to imprint the graduated scale lines thereon with the vehicle. The thermometer is then rotated to orient the second flattened face 22 into cooperative relationship with the printing plate for performing a similar operation. The corresponding numbers for the graduated scale are then printed on the face 22. By similar operation, trademarks, manufacturing code data and other indicia may be printed on the face 24 of the thermometer stem.

The selected silver compound, preferably silver sulphate, is now applied to the printed scale and numbers. This may be accomplished by means of a dusting technique whereby the substance in powdered form may be dusted on the printed vehicle by means of a suitable brush 34. It should be understood that other finely powdered glass staining materials may be employed and reference should be made to the glass staining art for other representative materials. Naturally, these powdered materials should be removed from the background areas and lens so that no "haze" from random dust particles is produced during the subsequent baking or heating step.

The thermometers processed in this manner are subjected to a centrifuging operation for purposes of removing all of the mercury from the capillary 16 leaving mercury only in constriction 18 and bulb 14.

The thermometers are subsequently baked or subjected to a heating cycle at a sufficient temperature and length of time to develop the glass stain. These temperatures should be maintained below a point at which the capillaries 16 or the constriction 18 are changed in dimension so that retreaters are not produced nor are changes of calibration of the mercury column introduced whereby the thermometers will fail to pass certification tests. Temperatures employed may range from 700° to 730° F. for a sufficient period of time to develop the desired degree of stain. Successful results have been obtained with baking capable of generating glass temperatures in the neighborhood of 720° F. for a duration of time for approximately two hours. Glass temperatures of about 730° and baking temperatures of four hours have also produced acceptable thermometers. In actual practice, it has been observed that effective ion exchange does not take place until a threshold temperature of about 700° F. is reached. The upper limit of temperature, naturally, is that at which adverse effects are caused by extremely high heat, as for example, melting or flowing of the glass and destruction of the acceptable characteristics of the bore of the stem and constriction provided therein, or warping of the thermometers, producing "bananas." The lower limit, naturally, is that at which acceptable staining is developed.

At the same time, the bulbs and contractions must be kept at a minimum temperature below the point where mercury would expand and flow up into the capillary. Such flow often produces bursting of the thermometer.

Of particular importance is the provision of auxiliary heat just above the constriction 18 during the baking cycle to maintain the desired temperature at the indicia on the glass thereabove, despite the continuous flow of heat down through the cross section of the glass stem into the bulb and then from the bulb to the coolant. The transfer of this auxiliary heat should be at a rate which matches the heat loss rate through the cross section of the glass to the bulb and coolant. In this manner, the glass temperature along the imprinted region where scales and indicia are to be developed, remains substantially uniform and at the optimum temperature, despite continuous loss of heat to the cooling medium.

This problem of heat loss is particularly pointed out in FIGS. 6 and 7 where arrows display the flow of heat in connection with the thermometer blank 20. Thermometer blank 20 and cooling medium 50a are both shown schematically housed within a heating apparatus or oven 51. The heat is transferred from oven 51 to thermometer blank 20 along the length of its exposed stem and then, due to the lower temperature of cooling bath 50a there is a downward blow of heat along the length of thermometer blank 20 and where it is submerged in water bath 50a.

As can be seen in FIG. 7, the provision of an auxiliary heating element 44a at the stem of thermometer blank 20 above water bath 50a, but below the marking area on thermometer blank 20 solves this problem of heat loss. The upper portion of the stem of thermometer blank 20 will be maintained at a substantially standard temperature while the auxiliary heater provides the additional heat to be absorbed by water bath 50a.

Thus, in FIGS. 8 and 8a displaying a practical embodiment, a heater or oven 40 is shown adapted to maintain an internal atmosphere of approximately 720° F. The thermometers may be suitably mounted by means of a tray 42 which is adapted to advantageously mount an auxiliary heating means which may assume the form of Nichrome heater ribbons 44 which are so formed to provide spaced openings 46 for receiving therein the stem of the representative blank 20. Bulb portion 14 of the blank may be disposed within the opening of the representative rubber grommet 48 to maintain the desired vertical position of the blank as well as protection of bulb 14. As illustrated, the bulb as well as the contractions while in the oven are disposed in a cooling water bath 50 which maintains the temperature of this portion of the thermometer blank at a desired level, preferably below 90° F.

With respect to the oven for developing the applied stain and particularly the auxiliary heater, it should be observed that the stem of the thermometer blank is in direct contact with the heater ribbons. It has been found that air-to-glass heat transfer at this particular location sometimes is not adequate; and to counterbalance the heat transfer into the cooling bath, direct engagement of the heater with the glass is preferable. In this manner, substantially uniform staining throughout the length of the stem of the thermometer is assured.

If baked thermometers are to be removed without waiting for the oven to be cooled down (which may easily take over an hour to get near a 90° level) thermometer bulbs must be kept cool while being removed from the oven. If the thermometers are lifted out of the cooling bath 50 while the oven is at or near baking temperatures, the mercury will instantly shoot up into the capillary where the glass is at top heat, thereby vaporizing the mercury and developing high pressures and perhaps bursting thermometer bulbs. Tray 42 can be removed from heated oven 40 while maintaining the bulbs and contractions of the thermometers in the cooling bath until such time as the mercury in the thermometers are not affected by the temperature of oven 40. Trays 42 may then be refilled with new thermometer blanks 10 and then placed back into oven 40 to initiate the next baking cycle. Alternatively, as previously indicated, before removing the baked thermometers, the temperature of the interior of the oven may be suitably lowered to a level at which there will be no detrimental effects on the thermometers.

The thermometers are then cleaned to remove any residuum of chemicals and water marks at bulk and constriction locations.

During the handling of the imprinted thermometer blanks and prior to the baking step, a fixative coating may be suitably applied by spraying, dipping, or the like to minimize, if not eliminate, smearing of the printing. Otherwise the thermometers are required to be carefully handled particularly during centrfiuging and loading in racks for baking. The centrifuging of the thermometer blanks could readily be performed before printing rather than after. If this be the case, heat as, for example, from fingers should not be applied to the bulbs during handling or holding otherwise the mercury may be driven above the constriction. Precooling or heat insulating sleeves to protect the bulb and offset whatever temperature may be generated by one's fingers can be satisfactorily applied along with the present invention. It is also contemplated by this invention to mix and mill the chemical stain material with the vehicle to provide a printing ink to thereby eliminate dusting and dust cleaning steps. However, optimum results will be realized upon the inclusion of a relatively large proportion of the staining pigment in the vehicle to produce the necessary degree of migration from silver ions during development.

Thus, among others, the several aforenoted objects and advantages are most effectively attained. Although a single somewhat preferred embodiment of the invention has been illustrated and described in detail herein, it should be understood that this invention is in no sense limited thereby.

I claim:

1. A method of stain marking a filled glass conical thermometer to provide permanent and positive scales thereon flush with the surface of the thermometer stem, said method including providing a thermometer blank pointed with prescribed high and low temperature marks, applying a viscous and tacky vehicle to a stretchable printing plate having marks and indicia thereon corresponding to that to be on the thermometer stem, said vehicle only being applied to the marks and indicia on said plate, stretching the plate to an elongated condition such that marks appearing thereon corresponding with the prescribed high and low point marks on the thermometer stem are aligned, pressing the thermometer stem and plate together while maintaining this aligned position to transfer the vehicle on the plate onto the thermometer stem to thereby imprint the vehicle thereon in the form of the marks and indicia appearing on the plate, coating the vehicle on the thermometer stem with an ion exchange, heat decomposable metallic staining compound in particulate form by dusting said compound onto the stem such that the compound adheres thereto only through the action of said vehicle, cooling the bulb while applying a principal amount of heat to the thermometer stem with the coated compound thereon at a sufficient temperature and for a sufficient period of time to induce ion exchange between the compound and glass of the stem to thereby mark the thermometer with a permanent and integral scale and other indicia, and applying a supplemental amount of heat to the stem above the bulb portion and surface of the cooling bath and below said scale and other indicia to maintain the entire stem at substantially the same temperature to prevent heat loss from the thermometer scale and indicia region due to the cooling bath and to prevent excessive heating of any portion of the thermometer during development of the stain markings.

2. The invention in accordance with claim 1 wherein the staining compound is silver sulphate, the temperature of the applied principal heat range is between 700° to 730° F. and for a duration of not less than approximately two hours while the bulb portion and constriction is maintained at a temperature below the point where the mercury would expand and blow up into the capillary bore.

3. The invention in accordance with claim 1 wherein the vehicle being applied to the marks and indicia on said plate is applied in a relatively thin layer to facilitate the transfer of clear and distinct markings to the glass clinical thermometer.

4. The invention in accordance with claim 3 wherein a vehicle applicator roll having a predetermined pressure setting is utilized to facilitate the application of the thin layer of the selected vehicle to the raised character and indicia on the stretchable printing plate.

5. The invention in accordance with claim 1 wherein the thermometers are subject to a principal heating cycle at a sufficient temperature and length of time to develop the glass stain with the sufficient temperature being maintained below a point at which the capillary or the constriction of the thermometer blank is changed in dimension.

References Cited

UNITED STATES PATENTS

| | | | |
|---|---|---|---|
| 128,148 | 6/1872 | Hutchings | 117—38 |
| 398,851 | 3/1889 | Schulze-Berge | 101—426 |
| 2,220,096 | 11/1940 | Greene. | |
| 2,265,359 | 12/1941 | Neumann | 65—34 |
| 2,391,705 | 12/1945 | Isenberg | 117—13 |
| 2,706,761 | 4/1955 | Douglas | 73—371 |
| 3,083,116 | 3/1963 | Berndt | 117—13 |

S. LEON BASHORE, Primary Examiner

S. R. FRIEDMAN, Assistant Examiner

U.S. Cl. X.R.

65—60; 73—371; 101—426; 117—13, 38

PO-1050
(5/69)

UNITED STATES PATENT OFFICE
CERTIFICATE OF CORRECTION

Patent No. 3,481,725      Dated December 2, 1969

Inventor(s) Waldemar A. Ayres

It is certified that error appears in the above-identified patent and that said Letters Patent are hereby corrected as shown below:

Column 1, lines 3 and 4, change "Dickinson Becton and Company" to --- Becton, Dickinson and Company ---.

Column 1, line 28, change "CORSS" to --- CROSS ---.

Column 7, line 20 (Claim 1), change "conical" to --- clinical ---.

Column 8, line 14 (Claim 2), change "blow" to --- flow ---.

SIGNED AND
SEALED
JUN 23 1970

(SEAL)
Attest:

Edward M. Fletcher, Jr.
Attesting Officer

WILLIAM E. SCHUYLER, JR.
Commissioner of Patents